(12) United States Patent
Capolunghi et al.

(10) Patent No.: US 6,996,205 B2
(45) Date of Patent: Feb. 7, 2006

(54) METHODS AND APPARATUS TO FACILITATE REVIEW OF CT COLONOGRAPHY EXAMS

(75) Inventors: Renaud Capolunghi, Vanves (FR); Laurent Launay, Saint Rémy lès Chevreuse (FR); Jerome Knoplioch, Neuilly sur Seine (FR); Saad Ahmed Sirohey, Pewaukee, WI (US); Gopal B. Avinash, New Berlin, WI (US)

(73) Assignee: GE Medical Ssytems Global Technology Company, LLC, Waukesha, WI (US)

( * ) Notice: Subject to any disclaimer, the term of this patent is extended or adjusted under 35 U.S.C. 154(b) by 45 days.

(21) Appl. No.: 10/743,634

(22) Filed: Dec. 22, 2003

(65) Prior Publication Data
US 2004/0264753 A1  Dec. 30, 2004

Related U.S. Application Data

(60) Provisional application No. 60/482,038, filed on Jun. 24, 2003.

(51) Int. Cl.
*A61B 6/03* (2006.01)

(52) U.S. Cl. ................................. 378/4; 378/8

(58) Field of Classification Search ............... 378/4, 378/8, 15, 62; 382/131
See application file for complete search history.

(56) References Cited

U.S. PATENT DOCUMENTS

| | | |
|---|---|---|
| D256,373 S | 8/1980 | Marks |
| 6,043,084 A | 3/2000 | Scanlan et al. |
| 6,403,373 B1 | 6/2002 | Scanlan et al. |
| 6,477,401 B1 | 11/2002 | Johnson et al. |
| 6,485,409 B1 | 11/2002 | Voloshin et al. |
| 6,517,837 B1 | 2/2003 | Scanlan et al. |
| 2004/0136584 A1 * | 7/2004 | Acar et al. .................. 382/131 |
| 2004/0209234 A1 * | 10/2004 | Geiger ....................... 434/262 |
| 2005/0094858 A1 * | 5/2005 | Sirohey et al. ............. 382/131 |

FOREIGN PATENT DOCUMENTS

JP  2005013729 A  *  1/2005

* cited by examiner

*Primary Examiner*—David V Bruce
(74) *Attorney, Agent, or Firm*—Carl B. Horton, Esq.; Armstrong Teasdale LLP

(57) ABSTRACT

A method of performing a colon exam includes obtaining at least two initial Computed Tomography (CT) datasets, extracting colon automatically from the CT datasets, synthesizing views of the extracted colon, displaying a plurality of obtained and synthesized views of the colon simultaneously, and synchronizing the views.

22 Claims, 4 Drawing Sheets

METHODS AND APPARATUS TO FACILITATE REVIEW OF CT COLONOGRAPHY EXAMS

CROSS REFERENCE TO RELATED APPLICATIONS

This application claims the benefit of U.S. provisional application No. 60/482,038 filed Jun. 24, 2003, which is hereby incorporated by reference in its entirety.

BACKGROUND OF THE INVENTION

This invention relates generally to methods and apparatus for review of computed tomographic (CT) exams, and more particularly to methods and apparatus for review of CT colonography exams.

Colon Cancer is the third leading cause of cancer related mortality in the US with an estimated 57,000 deaths in 2003. Colonic polyps form a pre-cancerous stage of the disease and their removal has approximately a 90% 5-year survivability rate of the patient. One way to screen for colon cancer is colonoscopy. However, colonoscopy has an acceptance of approximately 37% due to its invasive nature. CT Colonography is a useful application, which may increase the acceptance of colon cancer screening by minimizing the use of the invasive colonoscopy procedure to only those patients in which a CT Colonography exam reveals a desire for a follow up colonoscopy procedure. The reported sensitivity of CT Colonography is about 60–70%. It is desirable to increase the sensitivity of CT Colonography.

BRIEF DESCRIPTION OF THE INVENTION

In one aspect, a method of performing a colon exam is provided. The method includes obtaining at least two initial Computed Tomography (CT) datasets, extracting colon automatically from the CT datasets, synthesizing views of the extracted colon, displaying a plurality of obtained and synthesized views of the colon simultaneously, and synchronizing the views.

In another aspect, a computer readable medium is provided. The medium is encoded with a program configured to instruct a computer to obtain at least two initial Computed Tomography (CT) datasets, extract colon automatically from the CT datasets, synthesize the views of the extracted colon, display the obtained and synthesized views simultaneously, and synchronize the views.

In yet another aspect, a Computed Tomography (CT) System is provided. The system includes a radiation source, a radiation detector, and a computer coupled to the radiation source and the radiation detector. The computer is configured to obtain at least two initial Computed Tomography (CT) datasets, extract colon automatically from the CT datasets, synthesize the views of the extracted colon, display the obtained and synthesized views simultaneously, and synchronize the views.

In another aspect, a method of performing a colon exam is provided. The method includes obtaining at least two initial Computed Tomography (CT) datasets, extracting colon automatically from the CT datasets, generating a 3D view of the colon, and synthesizing views of the extracted colon.

DETAILED DESCRIPTION OF THE INVENTION

Figure 1:
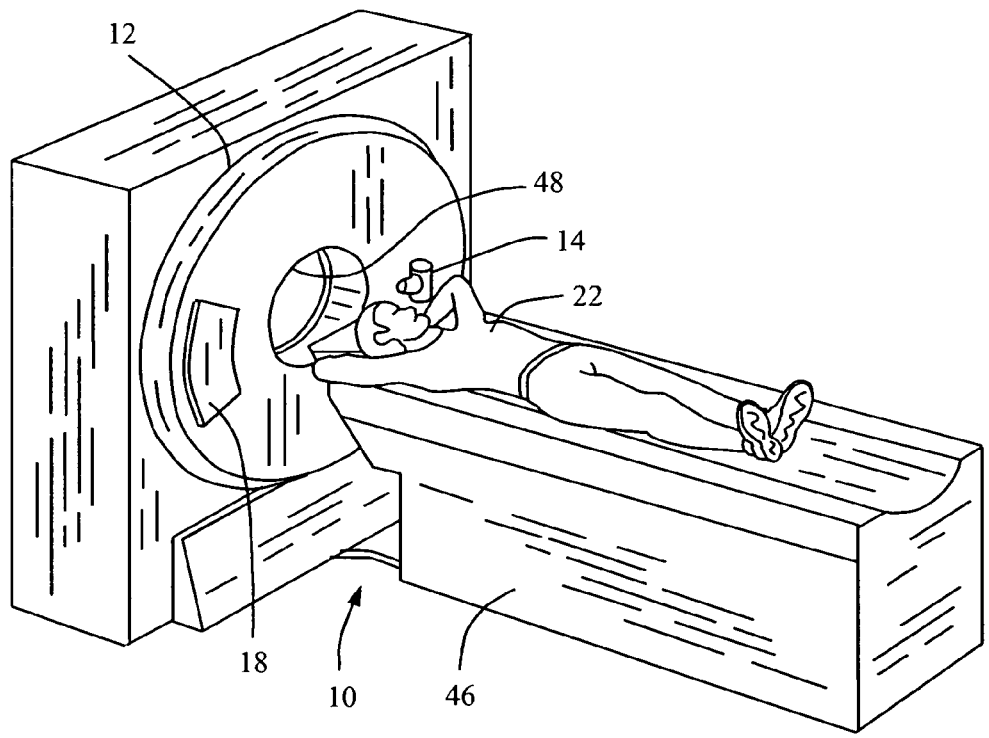
FIG. 1 is a pictorial view of a CT imaging system embodiment.

At least one known product provides tools to analyze the colon. The product includes a simple review mode, which provides the ability to simultaneously analyze exams acquired in prone and supine orientations, and an advanced review mode, providing a virtual dissection view as an output.

Herein described are methods and apparatus that employ a novel, completely automated workflow to perform a colon review, merging advantages of these two modes. That is, the herein described methods and apparatus provide for a simultaneous prone and supine and virtual dissection. A technical effect of the systems and processes described herein includes taking as an input a 3D data set of an original CT exam in both prone and supine orientations, and displaying 3D views of an extracted colon and registered 360-degrees unfolded views of an inner wall of the colon as an output. In one embodiment, intermediary results are displayed on a screen to inform a user on the process achievement. Additionally, in one embodiment, the user is given the ability to correct potentially erroneous results.

The herein described methods and apparatus automate all volume analysis tasks required for colon analysis purpose. Some of these tasks were heretofore performed by a radiologist. With the herein described automated methods and apparatus, the radiologist now just needs to validate the result and correct for possible errors. This automation is performed for both prone and supine exams and highly improves productivity for review. Additionally, information from both the prone and supine are displayed together in a simple and user-friendly visualization environment.

In some known CT imaging system configurations, a radiation source projects a fan-shaped beam which is collimated to lie within an X-Y plane of a Cartesian coordinate system and generally referred to as an "imaging plane", The radiation beam passes through an object being imaged, such as a patient. The beam, after being attenuated by the object, impinges upon an array of radiation detectors. The intensity of the attenuated radiation beam received at the detector array is dependent upon the attenuation of a radiation beam by the object. Each detector element of the array produces a separate electrical signal that is a measurement of the beam attenuation at the detector location. The attenuation measurements from all the detectors are acquired separately to produce a transmission profile.

In third generation CT systems, the radiation source and the detector array are rotated with a gantry within the imaging plane and around the object to be imaged such that an angle at which the radiation beam intersects the object constantly changes. A group of radiation attenuation measurements, i.e., projection data, from the detector array at one gantry angle is referred to as a "view". A "scan" of the object includes a set of views made at different gantry angles, or view angles, during one revolution of the radiation source and detector.

In an axial scan, the projection data is processed to reconstruct an image that corresponds to a two dimensional slice taken through the object. One method for reconstructing an image from a set of projection data is referred to in the art as the filtered back projection technique. This process converts the attenuation measurements from a scan into integers called "CT numbers" or "Hounsfield units", which are used to control the brightness of a corresponding pixel on a display device.

To reduce the total scan time, a "helical" scan may be performed. To perform a "helical" scan, the patient is moved while the data for the prescribed number of slices is acquired. Such a system generates a single helix from a fan beam helical scan. The helix mapped out by the fan beam yields projection data from which images in each prescribed slice may be reconstructed.

As used herein, an element or step recited in the singular and preceded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Also as used herein, the phrase "reconstructing an image" is not intended to exclude embodiments of the present invention in which data representing an image is generated but a viewable image is not. Therefore, as used herein the term, "image," broadly refers to both viewable images and data representing a viewable image. However, many embodiments generate (or are configured to generate) at least one viewable image.

Figure 2:
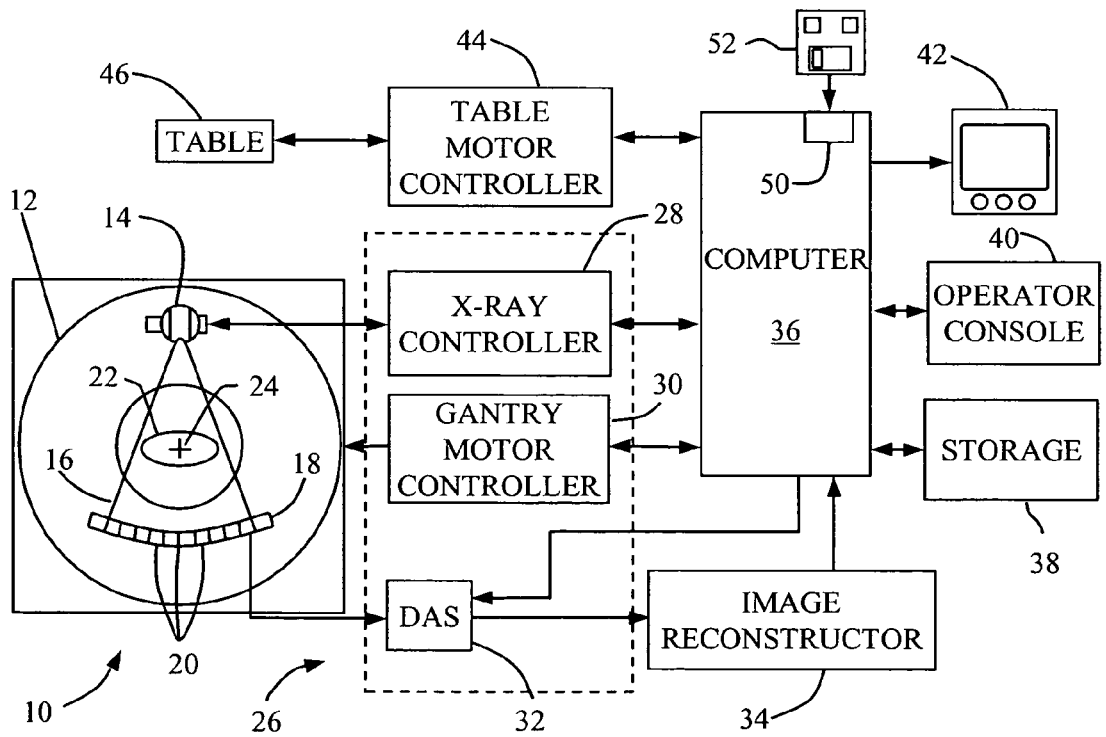
FIG. 2 is a block schematic diagram of the system illustrated in FIG. 1.

FIG. 1 is a pictorial view of a CT imaging system 10. FIG. 2 is a block schematic diagram of system 10 illustrated in FIG. 1. In the exemplary embodiment, a computed tomography (CT) imaging system 10, is shown as including a gantry 12 representative of a "third generation" CT imaging system. Gantry 12 has a radiation source 14 that projects a cone beam 16 of X-rays toward a detector array 18 on the opposite side of gantry 12.

Detector array 18 is formed by a plurality of detector rows (not shown) including a plurality of detector elements 20 which together sense the projected X-ray beams that pass through an object, such as a medical patient 22. Each detector element 20 produces an electrical signal that represents the intensity of an impinging radiation beam and hence the attenuation of the beam as it passes through object or patient 22. An imaging system 10 having a multislice detector 18 is capable of providing a plurality of images representative of a volume of object 22. Each image of the plurality of images corresponds to a separate "slice" of the volume. The "thickness" or aperture of the slice is dependent upon the thickness of the detector rows.

During a scan to acquire radiation projection data, gantry 12 and the components mounted thereon rotate about a center of rotation 24. FIG. 2 shows only a single row of detector elements 20 (i.e., a detector row). However, multislice detector array 18 includes a plurality of parallel detector rows of detector elements 20 such that projection data corresponding to a plurality of quasi-parallel or parallel slices can be acquired simultaneously during a scan.

Rotation of gantry 12 and the operation of radiation source 14 are governed by a control mechanism 26 of CT system 10. Control mechanism 26 includes a radiation controller 28 that provides power and timing signals to radiation source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized radiation data from DAS 32 and performs high-speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, radiation controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

In one embodiment, computer 36 includes a device 50, for example, a floppy disk drive or CD-ROM drive, for reading instructions and/or data from a computer-readable medium 52, such as a floppy disk or CD-ROM. In another embodiment, computer 36 executes instructions stored in firmware (not shown). Generally, a processor in at least one of DAS 32, reconstructor 34, and computer 36 shown in FIG. 2 is programmed to execute the processes described below. Of course, the method is not limited to practice in CT system 10 and can be utilized in connection with many other types and variations of imaging systems. In one embodiment, Computer 36 is programmed to perform functions described herein, accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits.

Figure 3:
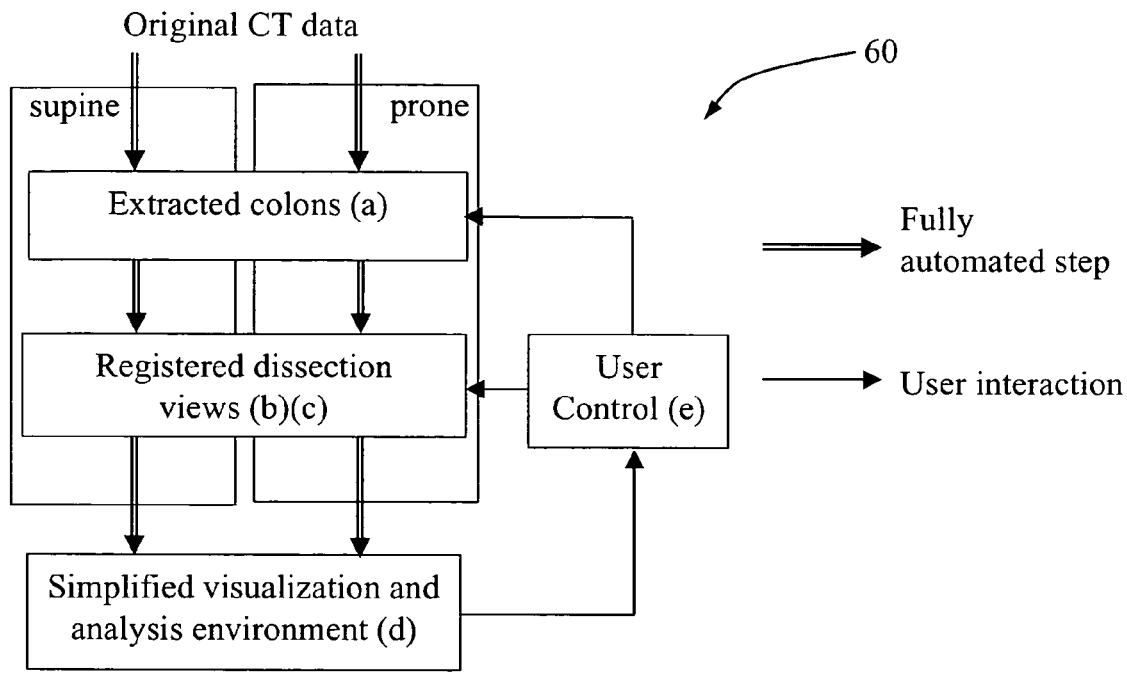
FIG. 3 is a flow chart.

FIG. 3 is a flow chart 60 illustrating a process used in one embodiment to generate the herein described images. Some of the herein described technical effects are achieved by a) an automatic extraction of a colon, b) a full 3D to 2D mapping of a colonic lumen, c) a simultaneous display of prone and supine dissection views, d) a providing of a visualization environment that facilitates colon analysis and localization, and e) a user control.

Figure 4:
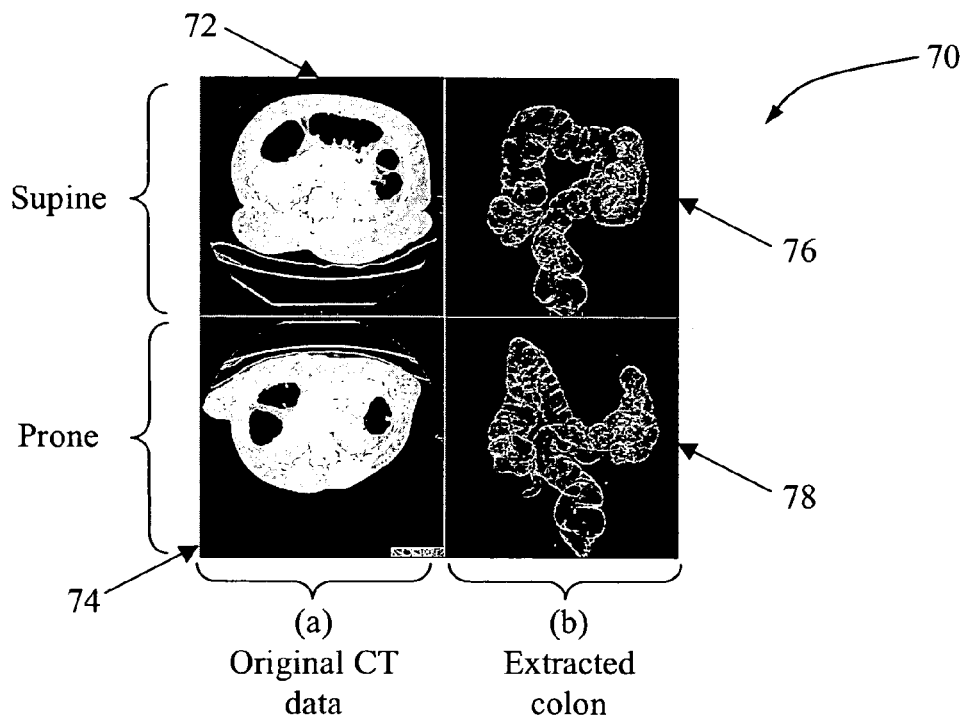
FIG. 4 illustrates data.

FIG. 4 illustrates data 70 including (a) original CT data including supine data 72 and prone data 74, and extracted data including extracted supine colon 76 and extracted prone colon 78. FIG. 4 was created using 3D image analysis algorithms based on intensity values of the original CT exams, that automatically extracted a center path (dashed lines in 76 and 78) of the colon and the colonic lumen for both prone and supine orientations.

Figure 5:
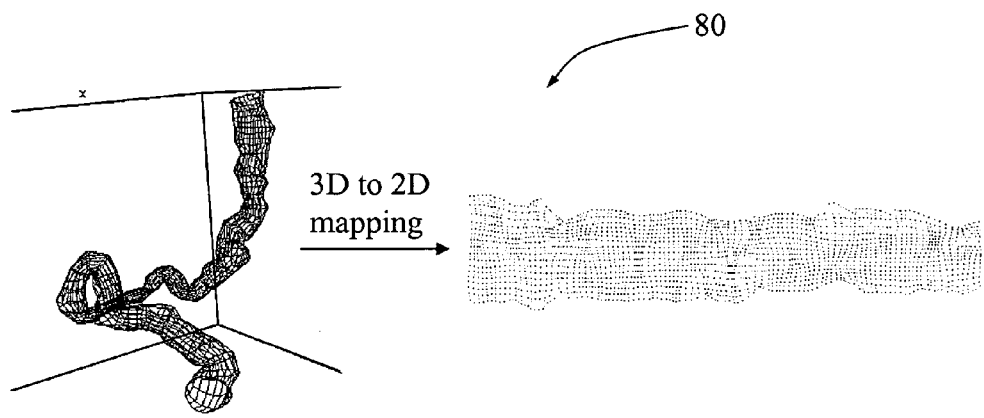
FIG. 5 illustrates using a 3D to 2D mapping to display the inner wall of the colon on a flat view with volume rendering.

FIG. 5 illustrates using a 3D to 2D mapping 80 to display the inner wall of the colon on a flat view with volume rendering. Here, volume rendering aids to distinguish between the undulations of the folds and polypoid protrusions on the basis of the intensity information as described by Bartroli, A. V., Wegenkittl, R., Konig, A., and Groller, E. "Nonlinear virtual colon unfolding", IEEE Proceedings:

Visualization, pp. 411–418, 2001. 3D to 2D mapping 80 builds a very comprehensive 360-degrees unfolded view of the inner wall of the colon. An overlapping area is displayed and highlighted (see FIG. 6).

Figure 6:
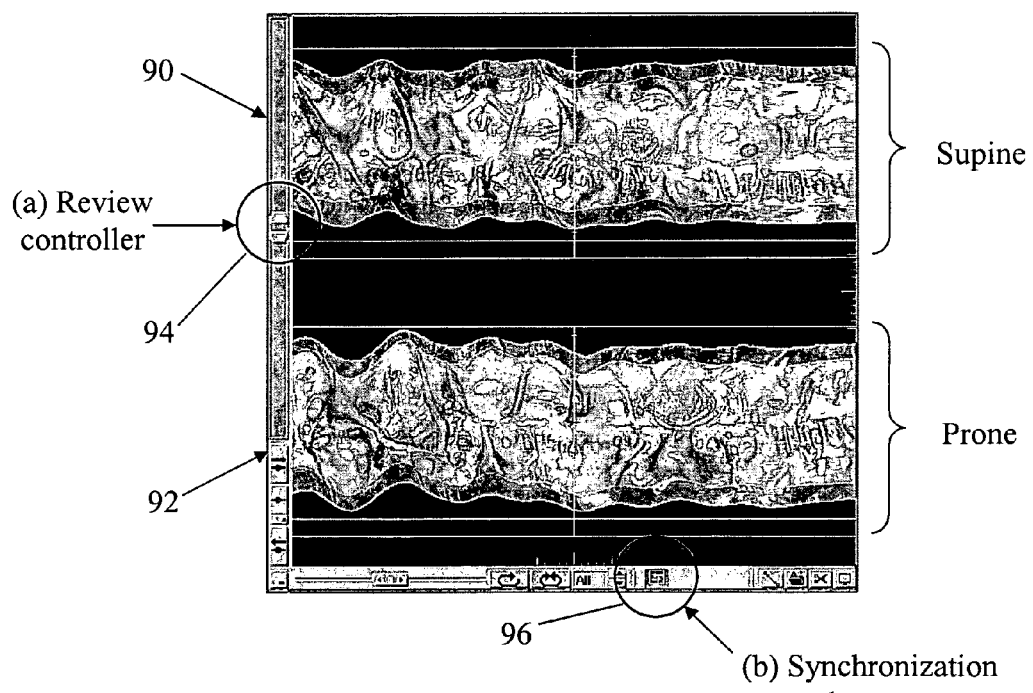
FIG. 6 illustrates a user interface.

FIG. 6 illustrates a user interface which, after a registration step based on geometric data taken from the results of steps a) and b), illustrates prone and supine dissection views displayed side by side simultaneously, so that any suspicious area can be simultaneously analyzed on both exams. Synchronized navigation is available using a single slider 94 which slides both exams synchronized together. A synchronization button 96 allows for a manual registering of the scans by the user if desired.

Figure 7:
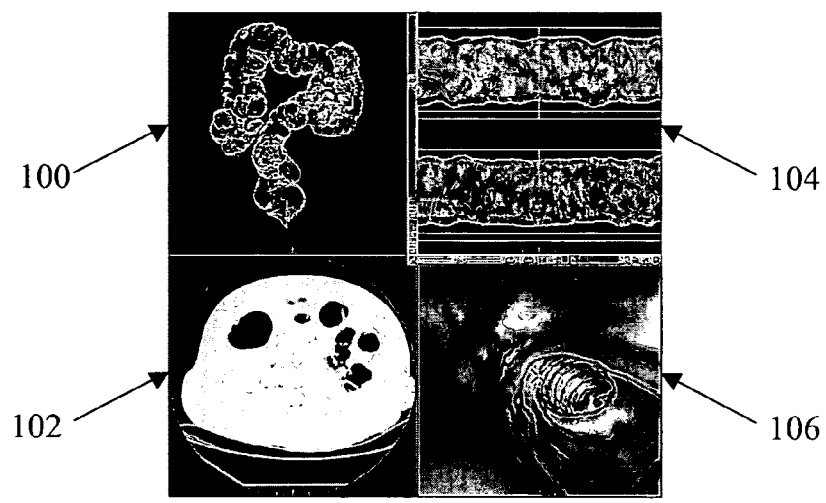
FIG. 7 illustrates several cross-referenced views and the user interface shown in FIG. 6.
Figure 8:
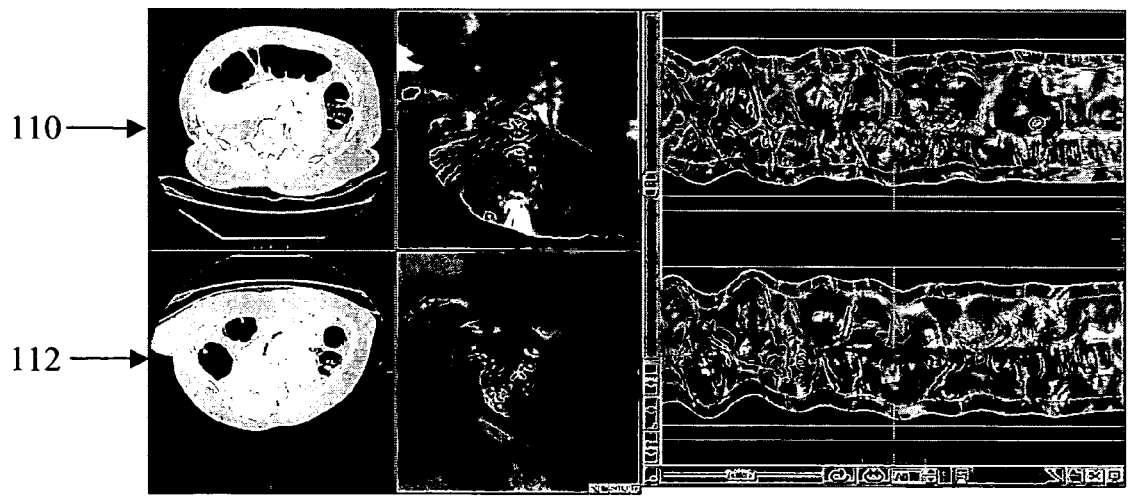
FIG. 8 illustrates several cross-referenced views and the user interface shown in FIG. 6.

FIGS. 7 and 8 illustrate examples in which results of previous steps are merged on a screen into several cross-referenced views, in order to provide a simple and efficient environment for colon analysis. In FIG. 7, a 3D view 100 of the extracted colon is provided for use as a 3D localizer, a dissection view 104 is provided for use as a roadmap (2D localizer) of the inner wall of the colon for polyps detection purpose, an endoscopic view 106 and an axial view 102 are provided for use for detailed analysis of suspicious areas. Due to cross-referencing and prone/supine registration, localizers and detailed views are directly linked, thus providing a fast and comfortable tool for detecting and analyzing suspicious areas. In one embodiment, the herein described methods and apparatus also enable the user to choose which type of views and orientations the user wants to display and saves this layout as a preference for further use. FIG. 8 includes a prone section 110 and a supine section 112. In this example, the resulting visualization and analysis environment includes axial, endoscopic, and dissection views for both prone and supine views.

Additionally, if the outputs of steps a), b) and/or c) are not acceptable to the user, the following actions are provided to the user. The user is able to redefine intermediary points to help the colon extraction algorithm (for each orientation independently), to manually edit the center path of the colon (for each orientation independently), and to manually register the colon dissection views.

Collectively, FIGS. 6, 7, and 8 illustrate the automation of a plurality of colon image processes including colon segmentation, tracking and 3D to 2D mapping, the simultaneous display of full 360 degrees virtual dissections of prone and supine exams, and combined reformatted views, 3D views, virtual dissection views and a navigator for the prone and supine views culminating in a smart and easy review environment to facilitate review of CT colonography exams. For example, when the user adjusts slider 94 while reviewing FIG. 8, the axial views and the endoscopic views are changed automatically with the dissection views as described above with reference to FIG. 6.

One technical effect of the herein described methods and apparatus is the simultaneous display of a plurality of synchronized views facilitating providing users examination results in an easy, user friendly environment.

While the invention has been described in terms of various specific embodiments, those skilled in the art will recognize that the invention can be practiced with modification within the spirit and scope of the claims.

What is claimed is:

1. A method of performing a colon exam, said method comprising:
   obtaining at least two initial Computed Tomography (CT) datasets;
   extracting colon automatically from the CT datasets;
   synthesizing views of the extracted colon by performing a 3D to 2D mapping to generate a 360-degrees unfolded view of an inner wall of the colon;
   displaying a plurality of obtained and synthesized views of the colon simultaneously; and
   synchronizing the views.

2. A method in accordance with claim 1 wherein obtaining at least two initial CT datasets comprises obtaining 3-dimensional (3D) CT datasets in both prone and supine orientations.

3. A method in accordance with claim 1 wherein extracting a colon comprises generating a 3D view of the colon.

4. A method in accordance with claim 3 wherein extracting a colon further comprises:
   extracting the colon a first time;
   displaying the colon extracted the first time;
   receiving a redefined intermediary point from a user; and
   extracting the colon a second time using the received redefined intermediary point.

5. A method in accordance with claim 3 wherein extracting a colon further comprises:
   extracting the colon a first time;
   displaying the colon extracted the first time;
   receiving a recalibrated center path of the colon from a user, in both the prone orientation and the supine orientation; and
   extracting the colon a second time using the received recalibrated center.

6. A method in accordance with claim 1 wherein displaying obtained and synthesized views of the colon simultaneously comprises displaying both a prone view and a supine view of a colon.

7. A method in accordance with claim 1 wherein displaying obtained and synthesized views of the colon simultaneously comprises:
   displaying a 3D view of the extracted colon;
   displaying a 2D prone dissection view and a 2D supine dissection view of the colon; and
   displaying an endoscopic view and an axial view of the colon.

8. A method in accordance with claim 1 wherein displaying obtained and synthesized views of the colon simultaneously comprises:
   displaying a plurality of views and orientations of the colon a first time;
   receiving at least one modification to at least one display layout preference from a user; and
   displaying a plurality of views and orientations a second time using the received modification.

9. A computer readable medium encoded with a program configured to instruct a computer to:
   obtain at least two initial Computed Tomography (CT) datasets;
   extract colon automatically from the CT datasets;
   synthesize the views of the extracted colon by performing a 3D to 2D mapping to generate a 360-degrees unfolded view of an inner wall of the colon;
   display the obtained and synthesized views simultaneously; and
   synchronize the views.

10. A computer readable medium in accordance with claim 9 wherein said program further configured to instruct the computer to obtain at least two initial CT datasets comprising 3-dimensional (3D) CT datasets in both prone and supine orientations.

11. A computer readable medium in accordance with claim 9 wherein said program further configured to instruct the computer to generate a 3D view of the colon.

12. A computer readable medium in accordance with claim 10 wherein said program further configured to instruct the computer to:
 extract the colon a first time;
 display the colon extracted the first time;
 receive a redefined intermediary point from a user; and
 extract the colon a second time using the received redefined intermediary point.

13. A computer readable medium in accordance with claim 10 wherein said program further configured to instruct the computer to:
 extract the colon a first time;
 display the colon extracted the first time;
 receive a recalibrated center path of the colon from a user, in both the prone view and the supine view; and
 extract the colon a second time using the received recalibrated center.

14. A computer readable medium in accordance with claim 9 wherein said program further configured to instruct the computer to:
 display a 3D view of the extracted colon;
 display a 2D prone dissection view and a 2D supine dissection view of the colon; and
 display an endoscopic view and an axial view of the colon.

15. A computer readable medium in accordance with claim 9 wherein said program further configured to instruct the computer to:
 display a plurality of views and orientations of the colon a first time;
 receive at least one modification to at least one display layout preference from a user; and
 display a plurality of views and orientations a second time using the received modifications.

16. A Computed Tomography (CT) System comprising:
 a radiation source;
 a radiation detector; and
 a computer coupled to said radiation source and said radiation detector, said computer configured to:
 obtain at least two initial Computed Tomography (CT) datasets;
 extract colon automatically from the CT datasets;
 synthesize the views of the extracted colon by performing a 3D to 2D mapping to generate a 360-degrees unfolded view of an inner wall of the colon;
 display the obtained and synthesized views simultaneously; and
 synchronize the views.

17. A system in accordance with claim 16 wherein said computer further configured to obtain at least two initial CT datasets comprising 3-dimensional (3D) CT datasets in both prone and supine orientations.

18. A system in accordance with claim 16 wherein said computer configured to extract a colon comprises generating a 3D view of the colon.

19. A system in accordance with claim 18 wherein said computer further configured to:
 extract the colon a first time;
 display the colon extracted the first time;
 receive a redefined intermediary point from a user; and
 extract the colon a second time using the received redefined intermediary point.

20. A system in accordance with claim 18 wherein said computer further configured to:
 extract the colon a first time;
 display the colon extracted the first time;
 receive a recalibrated center path of the colon from a user, in both the prone view and the supine view; and
 extract the colon a second time using the received recalibrated center.

21. A method of performing a colon exam, said method comprising:
 obtaining at least two initial Computed Tomography (CT) datasets;
 extracting colon automatically from the CT datasets;
 generating a 3D view of the colon; and
 synthesizing views of the extracted colon.

22. A method in accordance with claim 21 wherein synthesizing views of the extracted colon comprises performing a 3D to 2D mapping to generate a 360-degrees unfolded view of an inner wall of the colon.

* * * * *